Figure 1:
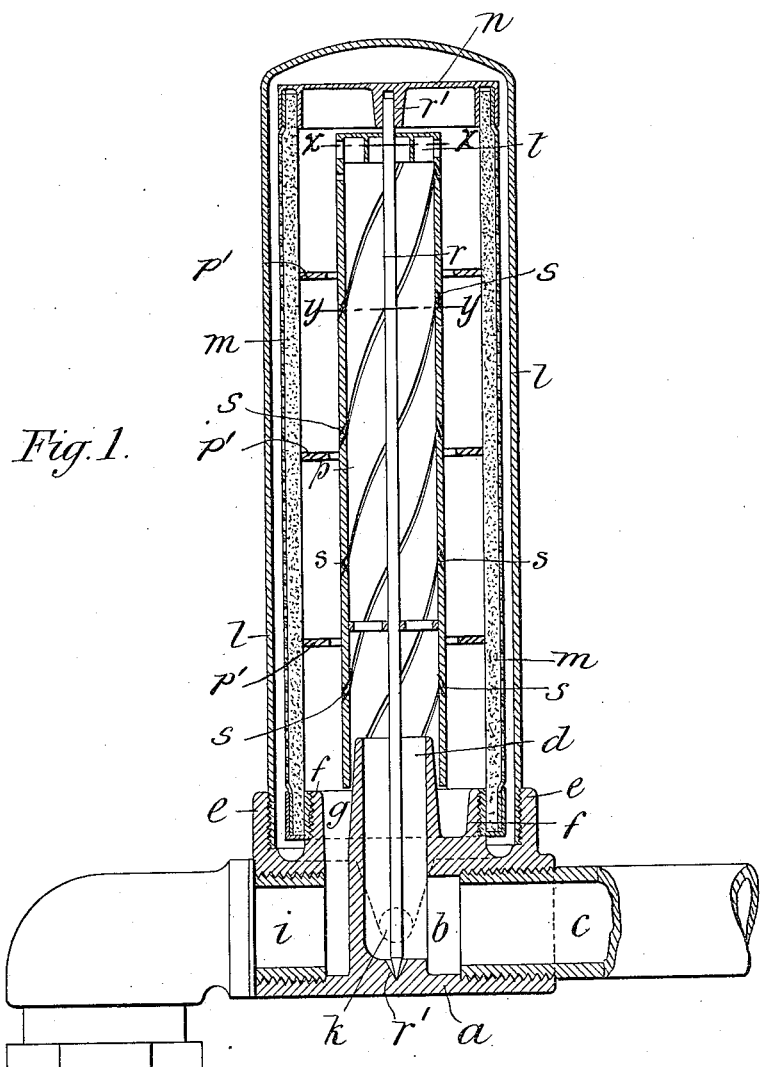

R. ADAMS.
SELF CLEANSING FILTER FOR DOMESTIC WATER SUPPLY.
APPLICATION FILED OCT. 5, 1908.

1,033,858.

Patented July 30, 1912.
3 SHEETS—SHEET 1.

Witnesses.

Inventor.
Robert Adams.
By
James L. Norris
Atty.

R. ADAMS.
SELF CLEANSING FILTER FOR DOMESTIC WATER SUPPLY.
APPLICATION FILED OCT. 5, 1908.
1,033,858.
Patented July 30, 1912.
3 SHEETS—SHEET 2.
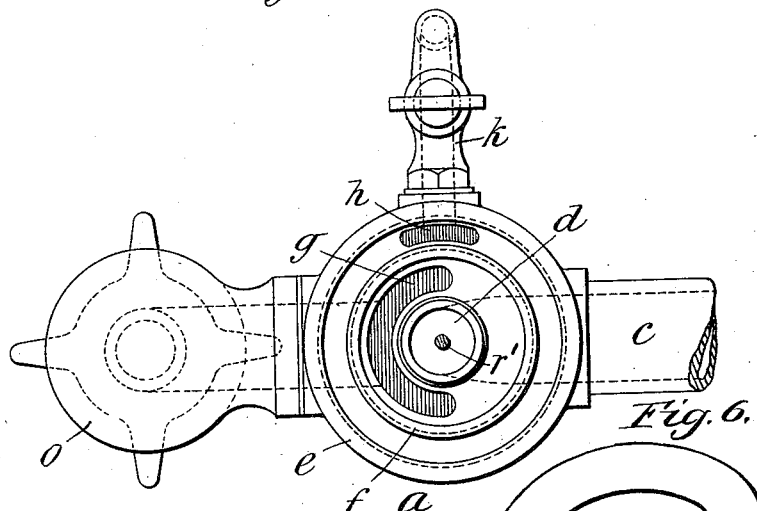
Fig. 2.
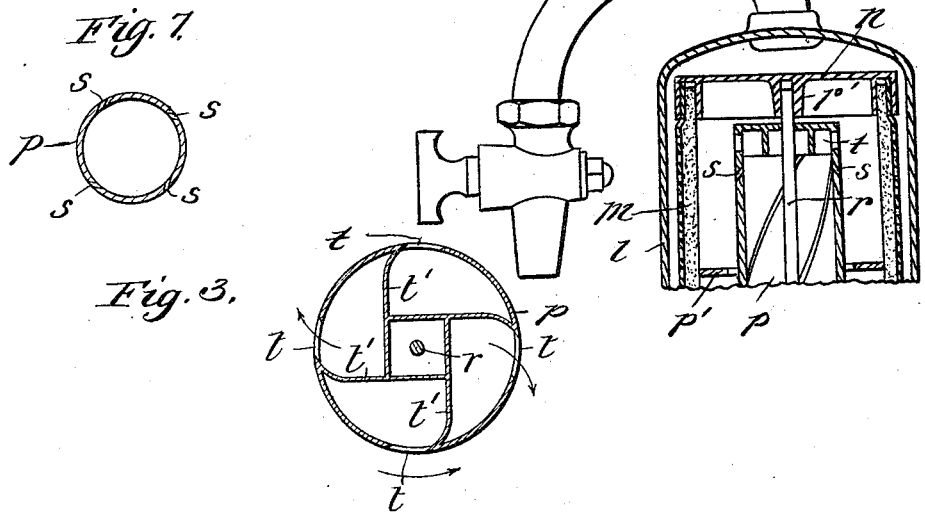
Fig. 6.
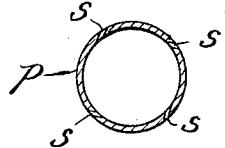
Fig. 7.
Fig. 3.
Witnesses.
Inventor.
Robert Adams,
By James L. Norris
Atty.

R. ADAMS.
SELF CLEANSING FILTER FOR DOMESTIC WATER SUPPLY.
APPLICATION FILED OCT. 5, 1908.
1,033,858.
Patented July 30, 1912.
3 SHEETS—SHEET 3.
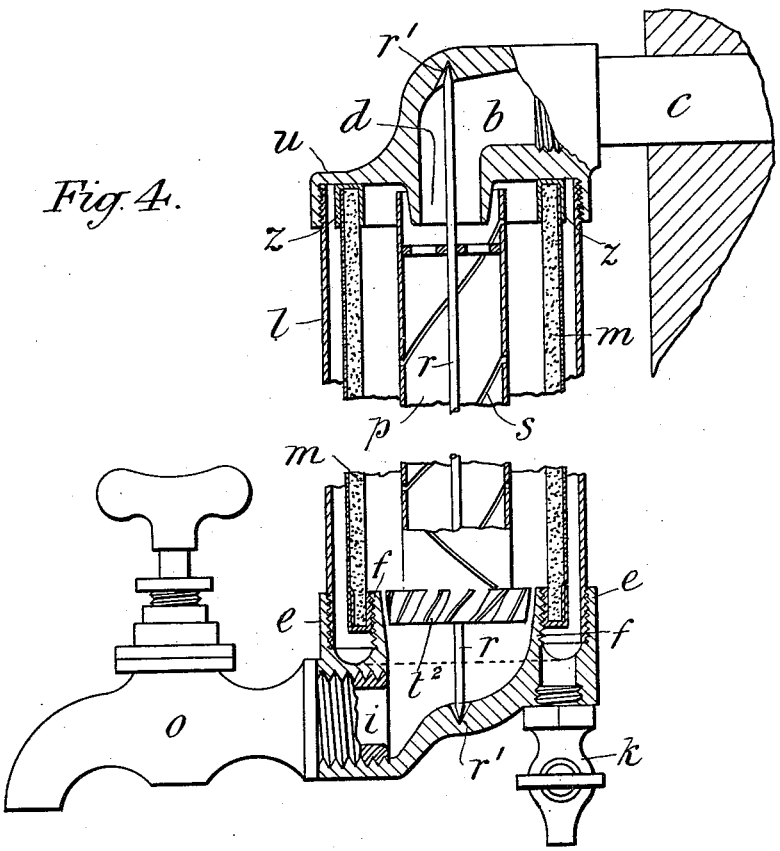
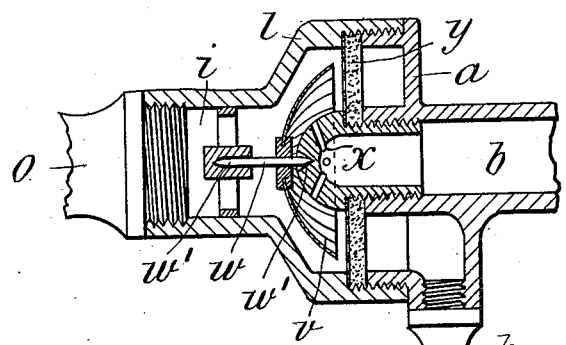

UNITED STATES PATENT OFFICE.

ROBERT ADAMS, OF LONDON, ENGLAND.

SELF-CLEANSING FILTER FOR DOMESTIC WATER-SUPPLY.

1,033,858.

Specification of Letters Patent.

Patented July 30, 1912.

Application filed October 5, 1908. Serial No. 456,304.

*To all whom it may concern:*

Be it known that I, ROBERT ADAMS, a subject of the King of Great Britain, residing at Emerald street, Theobalds Road, London, England, have invented certain new and useful Improvements in Self-Cleansing Filters for Domestic Water-Supply, of which the following is a specification.

This invention relates to that type of domestic water filter which is fitted on the main service water pipe and is so constructed and arranged that unfiltered as well as filtered water may be drawn therefrom.

It was found in other filters using an asbestos filtering medium that when filtered water was required a large amount of time was occupied in drawing the desired quantity owing to the slowness of the filtering process, and this condition was accentuated after a short period of service by the asbestos filtering medium becoming clogged. It has been also proposed to overcome this difficulty by passing all the water from the main service against the face of the filtering medium, so that when unfiltered water was being drawn off, the passing water might assist in cleansing the filtering medium. The means hitherto provided however have not satisfactorily accomplished the desired cleansing, some parts of the filter becoming cleansed while other parts remained clogged.

This invention has for its object an automatically operated mechanism for insuring the proper distribution of the water upon the filtering medium so that every portion thereof is subjected to the cleansing action of the water.

According to this invention a rotary distributer is provided which is mounted within the filter in the main service water channel so as to be rotated by the water as it flows to the tap and so as to distribute the water evenly over the whole surface of the filtering medium and thoroughly cleanse the same.

In the accompanying drawings, Figure 1 is a vertical section of a filter of the cylindrical type, Fig. 2 is a plan of the lower portion of Fig. 1, the cylindrical upper part being removed. Fig. 3 is an enlarged horizontal section taken on the line $x$—$x$ of Fig. 1. Fig. 4 is a modification of the filter shown in Fig. 1. Fig. 5 is a vertical section of a filter of the disk type. Fig. 6 is a detail elevation of a part of the upper portion of the filter showing a further modification. Fig. 7 is a horizontal section on the line $y$—$y$, Fig. 1.

Referring to Figs. 1, 2 and 3, $a$ is the base or lower portion of the filter, which is formed with an inlet channel $b$, arranged to be attached to the end of the service pipe $c$. $d$ is an upwardly extending nozzle forming a continuation of the water inlet channel $b$. The base $a$ is formed with two annular rings $e$ and $f$ concentrically arranged with regard to the nozzle $d$, the channels provided by the rings and the nozzle having ports or openings $g$ and $h$ see Fig. 2. The port $g$ communicates with the main water outlet channel $i$ and the port $h$ communicates with the filtered water outlet at $k$. $l$ is an outer cylindrical casing which screws into the ring $e$, and $m$ is a filtering cylinder which screws over the ring $f$, the upper end of the filtering cylinder being closed by an impervious cap $n$. $o$ is a cock or valve fitted to the main water outlet, $k$ being a cock or valve fitted to the filtered water outlet. The rotary distributer in this instance consists of a cylinder or tube $p$ which is preferably closed at its upper end and fixed to a spindle $r$, the latter being supported by its ends which are mounted in bearings $r'$ in the base $a$ and cap $n$ so as to freely rotate. The tube $p$ is shown formed with helically disposed slots $s$ inclined so that the water entering by the nozzle $d$ issues in helical streams tangentially against the inner wall of the filter cylinder $m$, causing the tube $p$ to rotate and consequently distribute the helical streams of water equally over the whole of the inner surface of the filter cylinder. The upper end of the tube $p$ may be formed or provided with tangential openings $t$ and vanes $t'$ through which or against which the water acts to assist the rotation of the tube $p$. The construction and arrangement of the openings and vanes is clearly shown in Fig. 3.

As a modification of the construction shown, and as illustrated by Fig. 6, the filtered water outlet may be arranged at the upper end of the casing. By this means the construction of the base $a$ would be simplified by the absence of the port $h$ and its outlet and cock.

The filter above described works as follows:—When the cock $o$ is closed and the cock $k$ opened for the delivery of filtered water, the water from the main passes through the nozzle $d$ into the tube $p$ whence it escapes through the helical slots $s$ and openings $t$ to the surrounding filtering medium $m$, percolating through said medium and finding its way to the outlet via the port $h$. When the cock $k$ is closed and the cock $o$ is opened, all the water which passes thereto passes through the nozzle $d$ into the tube $p$, through the slots $s$, in helical streams against the inner surface of the filtering medium $m$, which action sets up a brisk rotation of the said tube and then proceeds to the main water outlet $i$, via port $g$ and thence to cock $o$. It will thus follow that whenever unfiltered water is drawn from the cock $o$ the projection of the water in rotating streams effects a thorough cleansing of the filtering medium.

Referring to Fig. 4, which illustrates a modification of the filter shown in Figs. 1 to 3, the main water inlet $b$ is arranged at the upper part of the filter and the rotary tube $p$ has its lower end closed and is provided with external vanes $t^2$ located within the opening to the main water outlet $i$. The upper end of the filtering cylinder is adapted to make a fluid tight contact with the upper cap $u$ the lower end being screwed on to the ring $f$.

In some cases a helical baffle plate or a number of annular baffle plates may be fitted between the tube $p$ and the cylinder $m$ to retard the descent of the water to the outlet $o$, as shown in Figs. 1 and 6 and designated by the reference character $p'$.

In Fig. 5, a disk pattern filter is shown fitted with a rotary distributer in the form of a cup $v$ fixed to a spindle $w$ capable of freely rotating in bearings $w'$ the interior of said cups being fashioned with tangential grooves or vanes. The water from the main issues from the nozzle $x$ the jets from which are directed into the cup and thereby set up rotation of said cup. The streams of water are deflected back upon the filter disk $y$ and escape to the main water outlet $i$, or the water percolates through the disk $y$ to the filtered water outlet $k$, according to whichever cock is opened.

Preferably and to prevent leakage of water past the filter disk or cylinder or for uniting the two adjacent edges of a cylinder made from a sheet, the edges of the disk or cylinder are coated with rubber or are provided with a protector of channel section which may be of any suitable material according to the requirements. For example, in Fig. 1 the top and bottom end edges of the cylinder $m$ are provided with channel rings of metal or vulcanite or like material, and in Fig. 4 the top end edge of the cylinder $m$ is provided with a channel ring $z$ of rubber or analogous material used for making water-tight joints.

I claim:—

1. A filter comprising a casing, an inlet and an outlet for unfiltered main water, an outlet for filtered water, a filtering medium, and a water distributer rotatably disposed within the filtering medium.

2. A filter comprising a casing, an inlet and an outlet for unfiltered main water, an outlet for filtered water, a filtering medium, a water distributer rotatably disposed in the filtering medium and operated by the main water, and a nozzle communicating with the inlet for the main water and directing the latter into the distributer.

3. A filter comprising a base part having a main water channel and a nozzle, a casing attached to said base part, a filtering medium supported in said casing, a slotted water distributer rotatably disposed in the filtering medium and actuated by the inflow of the main water, the nozzle directing the main water into the distributer, a main water inlet and outlet, and a filtered water outlet.

In witness whereof I have hereunto set my hand in presence of two witnesses.

ROBERT ADAMS.

Witnesses:
  GEORGE C. DOWNING,
  T. J. OSMAN.

---

Copies of this patent may be obtained for five cents each, by addressing the "Commissioner of Patents, Washington, D. C."